(12) United States Patent
Dean et al.

(10) Patent No.: US 6,666,414 B2
(45) Date of Patent: Dec. 23, 2003

(54) DEFORMABLE MOUNTING BRACKET

(75) Inventors: Ronald Paul Dean, Fort Collins, CO (US); Kristina Lynn Mann, Fort Collins, CO (US); Sean William Tucker, Loveland, CO (US); David William Mayer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/080,341

(22) Filed: Feb. 21, 2002

(65) Prior Publication Data
US 2003/0155474 A1 Aug. 21, 2003

(51) Int. Cl.[7] .............................................. F16M 13/00
(52) U.S. Cl. ...................... 248/27.3; 248/27.1; 361/825
(58) Field of Search .............................. 248/27.1, 27.3, 248/309.1, 346.04, 292.13; 361/825, 814, 829, 807, 808, 679, 704; 312/7.1

(56) References Cited

U.S. PATENT DOCUMENTS

| 4,682,833 | A | 7/1987 | Ferchau et al. |
|---|---|---|---|
| 5,077,722 | A | 12/1991 | Geist et al. |
| 5,340,340 | A | 8/1994 | Hastings et al. |
| 5,654,873 | A | 8/1997 | Smithson et al. |
| 5,765,933 | A | 6/1998 | Paul et al. |
| 5,791,753 | A | 8/1998 | Paquin |
| 6,067,225 | A | 5/2000 | Reznikov et al. |
| 6,227,631 | B1 | 5/2001 | Lin et al. |

OTHER PUBLICATIONS

U.S. patent application Ser. No. 09/430,333, Roesner et al., filed Oct. 29, 1999.

U.S. patent application Ser. No. 10/080,189, Dean et al., filed Feb. 21, 2002.

Primary Examiner—Ramon O. Ramirez
Assistant Examiner—Tan Le

(57) ABSTRACT

Disclosed is a mounting bracket for a device comprising a resiliently-deformable surface, having a deforming element disposed therein, and a pair of attachment members disposed on opposite sides of and attached to the surface. The attachment members of the mounting bracket are adapted to interface with the device upon deformation of the deforming element.

17 Claims, 3 Drawing Sheets

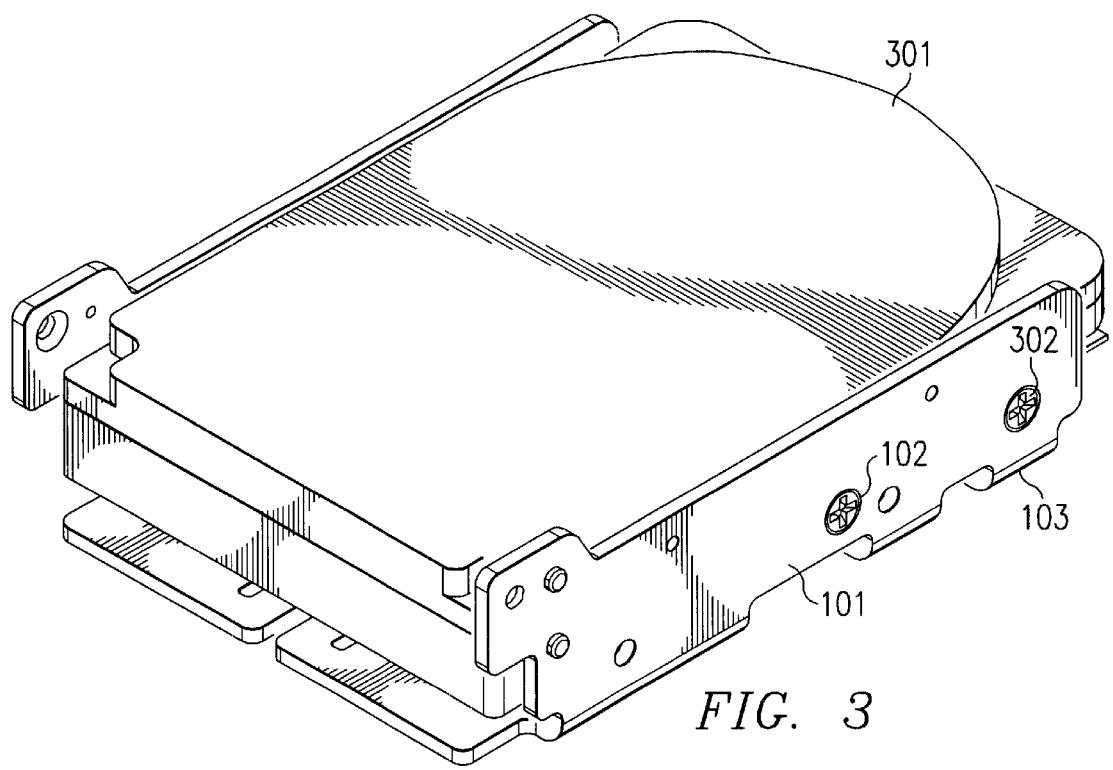
FIG. 3
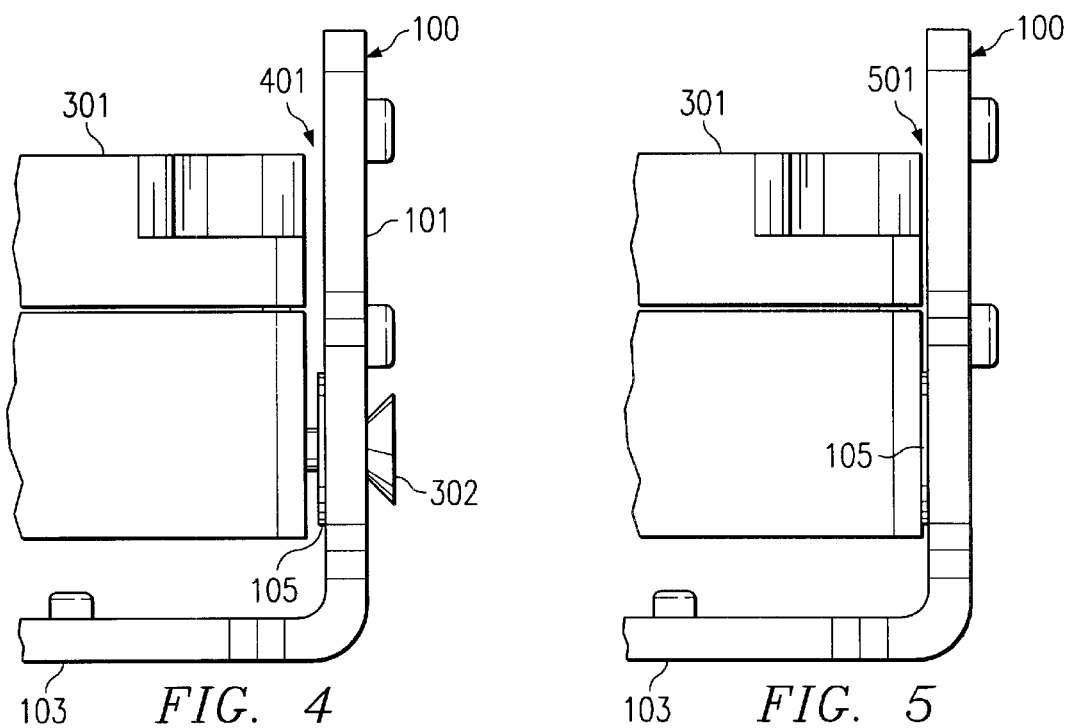
FIG. 4
FIG. 5

DEFORMABLE MOUNTING BRACKET

RELATED APPLICATIONS

The present application is related to commonly-assigned, concurrently-filed U.S. patent application Ser. No. 10/080189 entitled "SYSTEM AND MEANS FOR THE SECURE MOUNTING OF A DEVICE BRACKET" the disclosures of which is hereby incorporated herein by reference in its entirety.

TECHNICAL FIELD

The present invention relates to a deformable mounting bracket.

BACKGROUND

In designing systems many factors must be considered. One factor which must be considered in many systems is the dissipation of heat from heat-sensitive components. Although certain components may generate their own heat, great consideration is given in designing a system configured to keep as much heat as possible away from heat-sensitive components. Examples of heat-sensitive components may be found in automobile engines, aircraft engines, computer systems, (including, e.g., mainframe systems, and personal computers), telecom applications, hand-held phones, global-positioning systems and similar devices and systems. An exemplary system that would benefit from use of the present invention is a computer system. While the following paragraphs discuss computer systems, the present invention can be advantageously applied to a variety of situations in a variety of applications.

Traditionally, there are various methods for attaching devices to other devices or to other sub-assemblies of a system. One method involves the use of ordinary screws or other material fasteners. With mechanical screws, for example, the device may be provided with a threaded hole for receiving a screw. A sub-assembly, to which the device is to be coupled, may be provided with a corresponding hole that a screw fits through. Accordingly when the device and sub-assembly are properly aligned, a screw may be passed through the hole in a subassembly and threaded into the device, thereby mounting the device to that sub-assembly. Of course, similar coupling techniques may be used with other mechanical fasteners, such as brads, rivets, pins, clips, snaps, and the like.

Other artisans make use of an intermediate part between the device and subassembly to facilitate mounting. A bracket is an example of such an intermediate part. Sometimes brackets are simply sheet metal that are folded into a tray shape or other suitable configuration and mechanically attached to the device via mechanical fasteners.

For example, consider the disk-mounting brackets in common use in certain computer workstation products today. Basically, these products use the aforementioned folded metal brackets, in various configurations to correspond to the system chassis or disk drive bay configuration, for disk mounting. Some such brackets are made of a somewhat insubstantial, 1 mm thick, steel sheet that is folded into various predetermined shapes such that various devices, in particular, disk drives, may be fastened into the brackets using standard screws. Similarly, such disk-mounting brackets have been formed of plastics. Once the device, in this case a disk drive, is mounted to the bracket, the bracket itself may be mounted to the chassis using, for example, a spring snap-type of assembly or, alternatively, using screws. A disadvantage of these types of brackets is that they fail to provide appreciable thermal conduction of heat away from the device. Steel is typically a poor thermal conductor and brackets comprised of cobalt steel may suffer from an inability to adequately dissipate heat from the device; the plastics of other embodiments of such disk-mounting brackets provide even poorer thermal conductivity.

There have been brackets designed to facilitate mounting of a device into a sub-assembly and to conduct heat away from that device. These brackets take on a different shape and a different form from traditional sheet metal or plastic mounting brackets. This is due, in part, to the fact that these brackets must be constructed out of a highly thermally-conductive material such as aluminum, aluminum alloy, copper or gold. The material of construction and cost of such material may affect the construction of a bracket. Accordingly, such mounting brackets have not generally been available for widespread use, such as in the typical desktop computer system.

Although heat dissipating methods exist for use in high-end applications, these methods have not been broadly accepted because of their complexity and cost. For example, such methods typically make use of two rails that transverse opposite sides of the hard drive which rails are difficult to install. The rail system typically includes a pair of rails made out of die-cast aluminum and a piece of injection-molded plastic that attaches the two rails and helps keep all of the parts together as a sub-assembly. In practice, the rails are actually rotated out of the way of the device (so that the device can be partially lowered in) and then brought back into intimate contact with the device so the device can be mounted. Accordingly, the rail method suffers from the drawback that installation is often extremely difficult. Another disadvantage is that this method requires multiple separate parts, and each of these parts require separate toolings to fabricate them, thereby greatly increasing manufacturing costs.

The problem of difficult installation in many prior art systems is due, in part, to the fact that they used a die-cast aluminum material (which is a much poorer thermal conductor than a regular aluminum alloy). Die-cast aluminum brackets also require the use of an additional intermediate piece between the bracket and the device. The intermediate piece, called a thermal interface material, is typically a very thin, i.e. 0.020 inch thick, spongy material. The purpose of this intermediate piece of spongy material is to conduct heat from the device to the device bracket if necessary. One drawback of using a thermal interface material is that the thermal interface material makes installation extremely difficult because it tends to peel away from and off of the underlying disk bracket and to gather or bunch below the disk drive as it is installed. Accordingly, the actual installation of the disk is extremely difficult.

SUMMARY OF THE INVENTION

According to a preferred embodiment of the invention a mounting bracket for a device comprises a resiliently-deformable surface having a deforming element disposed therein, and a pair of attachment members disposed on opposite sides of and attached to the surface. The attachment members are adapted to interface with the device upon deformation of the deforming element.

According to another embodiment of the invention a mounting bracket for a device comprises a resiliently-deformable body including a portion comprising a flat spring, and a pair of members disposed on opposite sides of and attached to the body. The bracket receives and retains the device and the members movable under a deforming force applied to the flat spring to interface the members with the device.

Embodiments of the present invention provide a method of mounting a device in a housing, comprising forming a base portion of a bracket to include a resiliently-deformable section, inserting the device into the bracket, and applying a force to members of the bracket to cause the members to move inwardly while simultaneously deforming the base portion so as to bring said members into contact with the device.

Another embodiment of the invention provides a mounting bracket for a device comprising means for disposing members of the bracket at opposite sides of said device, means for applying a force to the members of the bracket to cause the members to move inwardly while deforming a deformable portion of a base of the bracket so as to bring the members into contact with the device without deforming other portions of the base of said bracket.

BRIEF DESCRIPTION OF THE DRAWINGS

FIG. 3 is a perspective view a disk drive mounted in the conduction bracket of FIG. 1;

FIG. 4 is a side view of a disk in the conduction bracket of FIG. 1 prior to tightening of the connection screws;

FIG. 5 is a sideview of a disk in the conduction bracket of FIG. 1 after tightening of the connection screws;

DETAILED DESCRIPTION

The present invention encompasses systems and methods for dissipating heat from heat-sensitive components and devices. According to preferred embodiments of the invention, the use of a deformable, heat conducting, bracket enables for easy installation of components and allows for dissipation of heat from heat-sensitive components.

Figure 1:
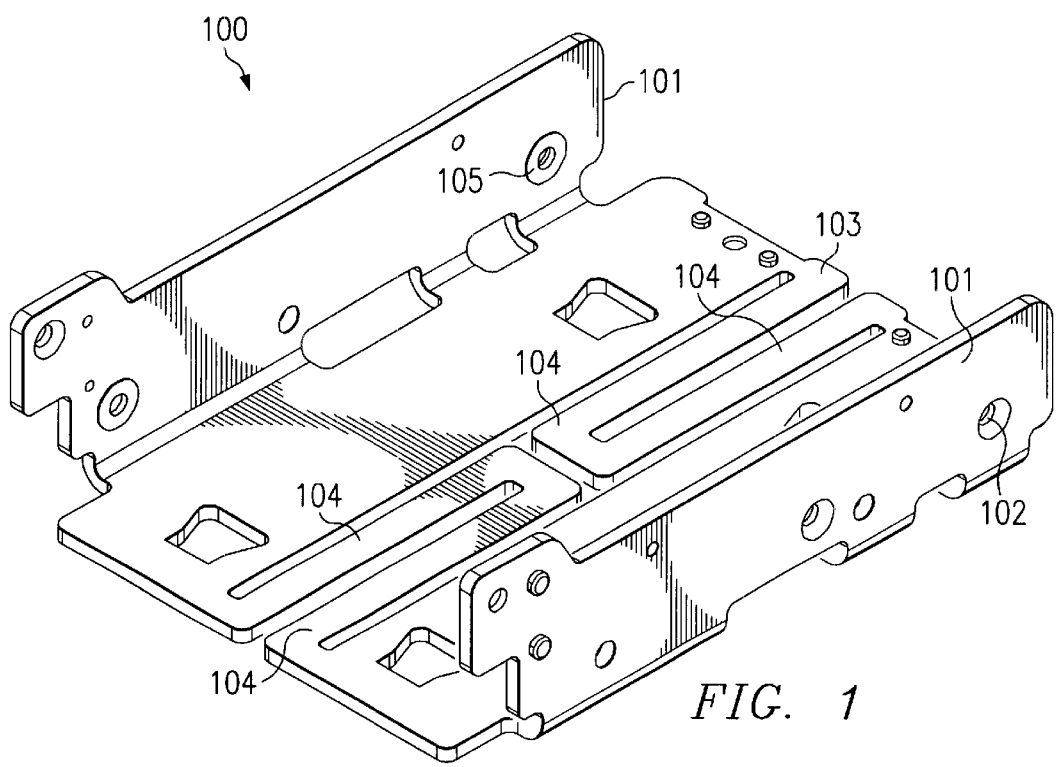
FIG. 1 is a perspective view of an embodiment of a conduction bracket according to the invention.
Figure 2:
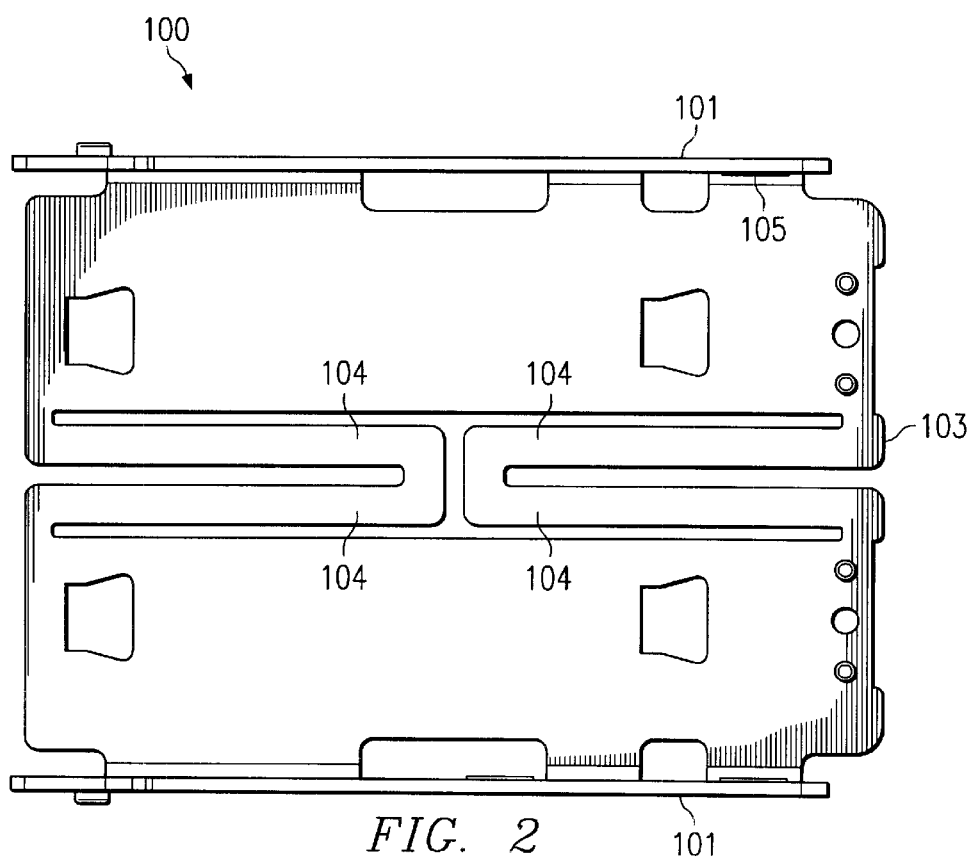
FIG. 2 is a top view of the conduction bracket of FIG. 1.

As depicted in FIGS. 1 and 2, a presently preferred embodiment of the invention comprises conduction bracket 100. Preferably, conduction bracket 100 is made of an aluminum alloy, as are well-known in the art for providing desirable levels of thermo-conductivity, rather than cast aluminum or steel, thereby providing superior thermal conductivity performance. According to this embodiment of the invention, conduction bracket 100 may be a solitary piece of an aluminum alloy that is formed using a traditional sheet metal stamping-and-folding operation or die press.

Conduction bracket 100 may comprise two sidewalls, or members, 101 on opposite sides of a bottom, or body, portion 103. Sidewalls 101 may be folded at approximately a 90° angle to provide for the insertion of a floppy disk drive, or disk drive 301 (shown in FIG. 3). Sidewalls 101 may serve to ensure disk drive 301 is held in the proper location and orientation in conduction bracket 100.

Sidewalls 101 may be provided with screw holes 102 for enabling the mechanical attachment and retention of disk drive 301 to conduction bracket 100. Of course, alternative embodiments of conduction brackets of the present invention may utilize additional or alternative structure for mounting corresponding devices. For example, brad receivers, spring clips, and/or the like may be utilized in addition to or in the alternative to the screw holes of the illustrated embodiment.

Preferably, screw holes 102 may be a through-hole for the screw itself, and preferably, also includes a countersink to accommodate a flathead screw. As shown in FIG. 3, flathead screws 302 may pass through these holes and fit into the corresponding countersinks to provide for mechanical attachment of disk drive 301 to bracket 100. Preferably, the exact positioning of screw holes 102 or other device mounting structure is pre-determined or dictated by the positioning of standard mounting holes in hard drives or other devices to be mounted. Thus, screw holes 102 of the preferred embodiment are positioned to align with the corresponding screw-receiving holes of disk drive 301.

The bottom portion 103 of conduction bracket 100 preferably provides a surface for disk drive 301 to reside when installed. Bottom portion 103 is preferably configured to comprise compression elements 104. For example, the illustrated embodiment comprises a compressible lateral midline portion connecting opposing outer lateral portions of bottom portion 103.

Compression elements 104 allow bottom portion 103 to be deformed under mechanical pressure preferably providing for an overall maximum decrease in lateral dimension of bottom portion 103 of between approximately 1 and 10 percent. A particularly advantageous configuration of compression elements 104 is a serpentine configuration where slits provide a deformable or compression area. Other suitable configurations of compression elements 104 are contemplated by the invention, such as an arcuate spring, a torsion spring, an articulated spring, bias spring, and/or the like. Preferred embodiment configurations of the present invention implement such elements as a flat spring in order to facilitate simplified manufacturing, such as the aforementioned stamping-and-folding operation. However, other configurations of compression elements may be utilized, if desired. It should be appreciated that, although 2 compression elements are shown in the illustrated embodiment, any number of such elements may be utilized according to embodiments of the present invention. Moreover, embodiments of the present invention may provide an expansion element, providing a deformable expansion area, configuration of bottom portion 103, if desired.

In practice, disk drive 301 is lowered into disk bracket 100 (which is nominally oversized) and rests on bottom portion 103 (see FIG. 3). As screws 302 are tightened through screw holes 102 of sidewalls 101 of conduction bracket 100 into disk drive 301 itself, compression elements 104 enable bottom portion 103 of conduction bracket 100 to be deformed. Effectively, compression elements 104 act similar to a spring and enable bracket 100 to be nominally oversized but deformable such that sidewalls 101 come into intimate thermal contact with disk drive 301 when installed by bringing sidewalls 101 into contact with the sidewalls of disk drive 301. This compression of bottom portion 103 increases the contact area available for the transfer of heat from the drive to the bracket as the angle of attachment of sidewalls to the bottom is not substantially distorted, but rather the distance between the sidewalls is reduced. Moreover, where the sides of the device to be mounted are not completely normal to the bottom portion of the bracket, the compression elements provide freedom for the bracket sidewalls to be positioned for increased area contact with the device sides.

Conduction bracket 100 may also have embossments 105 located on the inside of the sidewalls 101 at all mounting screw hole 102 locations. Embossments 105 may be formed through traditional stamping operations for sheet metal and function to provide a permanent positive stop for disk drive 301 relative to sidewalls 101 of conduction bracket 100. When drive disk drive 301 is installed into conduction bracket 100 in its final position, embossments 105 preferably maintain a small gap, e.g., about 0.010 of an inch, between drive disk drive 301 and the metallic structure of conduction bracket sidewalls 101 themselves. The gap is of appropriate dimension to enable the use of an intermediate thermal interface material (shown in FIGS. 6 and 7) if desired. Embossments 105 may act as a positive stop to make sure that any thermal interface material which may be used is compressed to the proper distance when disk drive 301 is installed. Exemplary thermal interface materials available for use with embodiments of the present invention may include thermally-conductive elastomer sheet material such as those manufactured by Shin-Etsu MicroSI, ArcticSilver, Power Device, Chomerics, Bergquist and/or AOS Thermal Compound.

FIG. 4 shows a close-up view of disk drive 301 in its installation position within conduction bracket 100 before screws 302 are tightened, i.e., before the final installation occurs. As shown, disk drive 301 is seated in its proper location within conduction bracket 100 but backed away from sidewalls 101 leaving gap 401. As previously described, embossments 105 help establish the final resting position of disk drive 301 with respect to sidewall 101.

In the uncompressed position, as depicted in FIG. 4, there is an appreciable gap 401 between disk drive 301 and sidewall 101 of conduction bracket 100. Screw 302 is shown in its starting position, meaning it has just been threaded into contact with disk drive 301, but is still significantly out away from sidewall 101 of conduction bracket 100. Thus, the subassembly starts out with gap 401 between disk drive 301 and conduction bracket 100 which enables disk drive 301 to be easily installed in the proper location without being impeded by conduction bracket 100 or having to pull bracket 100 away from the device. Mounting screws 302 are then further threaded into disk drive 301 and tightened to compress sidewall 101 of bracket 100 into disk drive 301 until it reaches the final position of the sub-assembly.

FIG. 5 depicts the compressed position of the conduction bracket subassembly after screws 302 are finally tightened. As depicted, disk drive 301 is now much closer to sidewall 101 of the conduction bracket 100 such that disk drive 301 is preferably flush against mounting embossments 105. Mounting screw 302 may no longer be visible in the side view because it has threaded all the way in the device; the head of the flathead screw is now flush with the outside wall of sidewall 101 and may fully rest within a countersink. Even though disk drive 301 is now flush against embossments 105, there may still be a small gap 501 between disk drive 301 and sidewall 101 of conduction bracket 100. Gap 501 is preferably the proper compressed thickness that would be used if a thermal interface material were used. A thermal interference material about 0.020 of an inch thick may be applied to sidewalls 101 of conduction bracket 100 on an inside surface or to an outside surface of disk drive 301. As screws 302 are threaded and conduction bracket 100 is compressed, a small, 0.010 inch, gap 501 between bracket 100 and sidewall 101 is created which is a sufficient compressed gap 501 for the thermal interface material.

Figure 6:
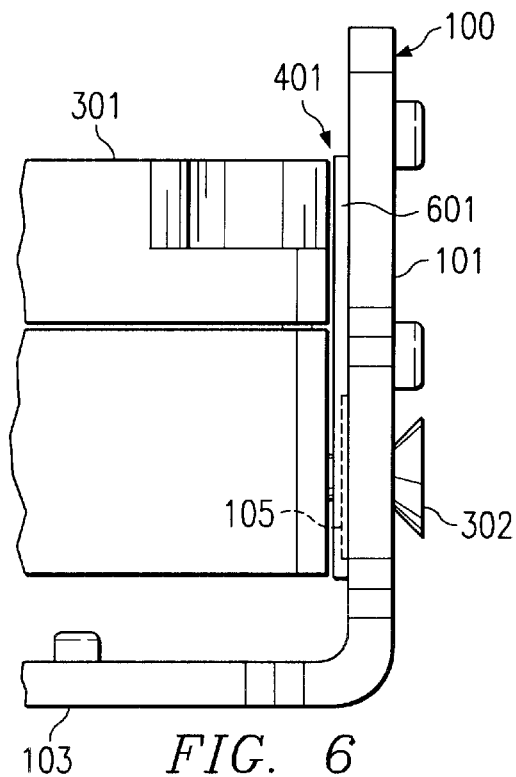
FIG. 6 is a side view of a disk in the conduction bracket of FIG. 1 prior to tightening of the connection screws and having a thermal interface material disposed in a gap between the disk and conduction bracket.
Figure 7:
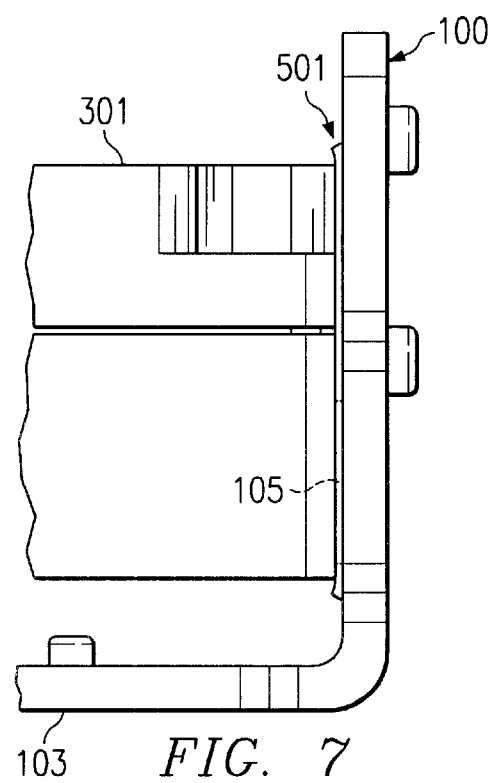
FIG. 7 is a side view of a disk in the conduction bracket of FIG. 1 after tightening of the connection screws and having a thermal interface material disposed in a gap between the disk and the conduction bracket.

FIG. 6 shows a close-up view of disk drive device 301 in its installation position within conduction bracket 100 before screws 302 are tightened, as shown in FIG. 4. However, FIG. 6 shows thermal interface material 601 disposed in gap 401 between disk drive 301 and sidewall 101. It should be appreciated that gap 401 preferably enables thermal interface material 601 to be disposed as illustrated without substantial interference from disk drive 301 as disk drive 301 is installed into conduction bracket 100. Moreover, it should be appreciated that embossments 105 preferably extend into, but not through, thermal interface material 601 in its uncompressed state. Directing attention to FIG. 7, however, it can be seen that the compressed position of the conduction bracket sub-assembly after screws 302 are finally tightened results in compression of thermal interface material 601 such that disk drive 301 is preferably flush against mounting embossments 105. As such, embossments 105 act to prevent compression of thermal interface material 601 further than that associated with gap 501.

It should be appreciated that the present invention is not limited to the particular embodiments described above. For example, the size of one or more of the gaps described above may be greater or less than set forth in the examples above. Additionally or alternatively, embodiments of the present invention may not include the use of the aforementioned thermal interface material. Alternatively, embodiments of the present invention may utilize a thermal interface material of a greater or lesser thickness than that of the embodiment described above. Moreover, the thermal interface material may be comprised of any material or combination of materials determined to provide attributes as described herein.

What is claimed is:

1. A mounting bracket for a device comprising:
   a resiliently-deformable surface having a deforming element disposed therein;
   a pair of attachment members disposed on opposite sides of and attached to said surface and adapted to interface with the device upon deformation of said deforming element, wherein each of said attachment members further comprises a raised embossment on inside portions of said attachment members; and
   a thermal interface material on said inside portions of said attachment members around said raised embossments, said raised embossments only partially extending through said thermal interface material in an uncompressed state thereof.

2. The mounting bracket according to claim 1 wherein said each of said attachment members comprise fastener attachment sites for receiving fasteners for interfacing said attachment members with the device upon deformation of said deforming element.

3. The mounting bracket according to claim 1 wherein said deforming element comprises one or more compression elements.

4. The mounting bracket according to claim 1 wherein said deforming element comprises a serpentine metal strip.

5. The mounting bracket according to claim 1 wherein said deforming element comprises a portion of said surface adapted to provide a spring element.

6. The mounting bracket according to claim 1 wherein said deforming element is adapted to provide linear deformation of said surface.

7. The mounting bracket according to claim 1 wherein said deforming element of said surface is compressed to bring said attachment members into contact with said device.

8. The mounting bracket according to claim 1 wherein said deforming element is comprised of machined aluminum alloy.

9. The mounting bracket according to claim 1 wherein said attachment members are comprised of aluminum alloy.

10. The mounting bracket according to claim 1 wherein said bracket is nominally oversized with respect to said device to define a gap between said attachment members and said device.

11. The mounting bracket according to claim 10 further comprising a thermal interface material disposed in said gap, and wherein said resiliently-deformable surface of said bracket is compressed to bring said interface material into intimate contact with said device.

12. The mounting bracket according to claim 11 wherein said thermal interface material is a thermally-conductive elastomer sheet material.

13. The mounting bracket according to claim 1 wherein said device is a computer storage device.

14. The mounting bracket according to claim 1 further comprising screw holes defined in said attachment members.

15. The mounting bracket according to claim 14 wherein said resiliently-deformable surface is deformed by action of screws inserted through said screw holes into said device.

16. The mounting bracket according to claim 1 wherein said resiliently-deformable surface comprises a compressible lateral midline portion connecting opposing outer lateral portions of said surface.

17. The mounting bracket according to claim 1 wherein said resiliently-deformable surface includes a flat spring midline portion connecting opposing outer lateral portions of said surface.

* * * * *